(12) United States Patent
Greimel-Rechling

(10) Patent No.: US 9,356,811 B2
(45) Date of Patent: May 31, 2016

(54) RECEIVER CIRCUIT FOR RECEIVING AN INPUT SIGNAL

(71) Applicant: ams AG, Unterpremstätten (AT)

(72) Inventor: Bernhard Greimel-Rechling, Wünschendorf (AT)

(73) Assignee: ams AG, Unterpremstaetten (AT)

( * ) Notice: Subject to any disclaimer, the term of this patent is extended or adjusted under 35 U.S.C. 154(b) by 362 days.

(21) Appl. No.: 13/851,017

(22) Filed: Mar. 26, 2013

(65) Prior Publication Data

US 2013/0257308 A1 Oct. 3, 2013

(30) Foreign Application Priority Data

Mar. 28, 2012 (DE) .......................... 10 2012 102 672

(51) Int. Cl.
*H04L 27/06* (2006.01)
*H05B 33/08* (2006.01)

(52) U.S. Cl.
CPC ................ *H04L 27/06* (2013.01); *H05B 33/08* (2013.01); *H05B 33/0842* (2013.01)

(58) Field of Classification Search
None
See application file for complete search history.

(56) References Cited

U.S. PATENT DOCUMENTS

| | | | | |
|---|---|---|---|---|
| 4,356,389 A * | 10/1982 | Quirey | ............... | G06K 7/10881 235/455 |
| 4,737,787 A | 4/1988 | Ito et al. | | |
| 6,031,404 A * | 2/2000 | Roither et al. | ................ | 327/307 |
| 6,772,351 B1 * | 8/2004 | Werner | ............. | H04L 25/03057 710/110 |
| 7,099,786 B2 * | 8/2006 | Nguyen | .................... | G06F 1/26 326/21 |
| 7,308,044 B2 * | 12/2007 | Zerbe | .................. | H04L 25/4917 327/333 |
| 7,626,529 B2 * | 12/2009 | Robert | .................. | H03M 1/162 341/118 |
| 7,919,994 B2 * | 4/2011 | Walker et al. | .................... | 327/98 |
| 8,180,526 B2 | 5/2012 | Ohtsuka et al. | | |
| 8,242,801 B2 * | 8/2012 | Greimel-Rechling | ............ | H03K 19/1732 326/30 |

(Continued)

FOREIGN PATENT DOCUMENTS

| | | |
|---|---|---|
| DE | 3687621 T2 | 6/1993 |
| DE | 112006003744 T5 | 1/2009 |
| DE | 102008044147 A1 | 4/2010 |

*Primary Examiner* — Alexander H Taningco
*Assistant Examiner* — Nelson Correa
(74) *Attorney, Agent, or Firm* — McDermott Will & Emery LLP

(57) ABSTRACT

A receiver circuit for receiving an input signal ($I_{DD}$, $U_{DD}$) comprises a detector circuit (111, 111a, 111b, 111c, 111d, 111e, 111f), which is in the form of a sample-and-hold circuit for determining a reference level of the input signal or in the form of a filter circuit for generating a mean value of levels of the input signal ($I_{DD}$, $U_{DD}$). The detector circuit generates, on the output side, a referential signal (RS), which is supplied to comparator circuits (113a, 113b, 113c, 113d, 115a, 115b, 115c, 115d). The comparator circuits (113a, 113b, 113c, 113d, 115a, 115b, 115c, 115d) compare an offset level of the input signal ($I_{DD}$, $U_{DD}$) with the referential signal (RS) and generate data signals (DATA, DH, DL). The offset input signals ($I_{DD}$, $U_{DD}$) are evaluated relatively in respect of the reference level or the mean value of the levels of the input signal.

15 Claims, 8 Drawing Sheets

(56) References Cited

U.S. PATENT DOCUMENTS

| | | | |
|---|---|---|---|
| 8,264,275 B2* | 9/2012 | Greimel-Rechling | H03F 3/217 330/10 |
| 8,320,494 B2* | 11/2012 | Zerbe et al. | 375/286 |
| 8,380,085 B2* | 2/2013 | Gupta et al. | 398/186 |
| 8,750,406 B2* | 6/2014 | Pan | H03D 1/00 375/286 |
| 8,867,595 B1* | 10/2014 | Luo | H03K 3/013 375/224 |
| 2004/0225811 A1* | 11/2004 | Fosler | H05B 37/0254 710/305 |
| 2005/0200287 A1 | 9/2005 | Ito et al. | |

* cited by examiner

RECEIVER CIRCUIT FOR RECEIVING AN INPUT SIGNAL

The invention relates to a receiver circuit for receiving an input signal from a control module for controlling a light module. Furthermore, the invention relates to a light module, in particular an LED module, for generating a light signal and a circuit arrangement for controlling the generation of a light signal. Furthermore, the invention relates to a method for evaluating an input signal for a receiver circuit for generating a data signal, wherein the receiver circuit can be used in a light module for communication with a control module.

Figure 1:
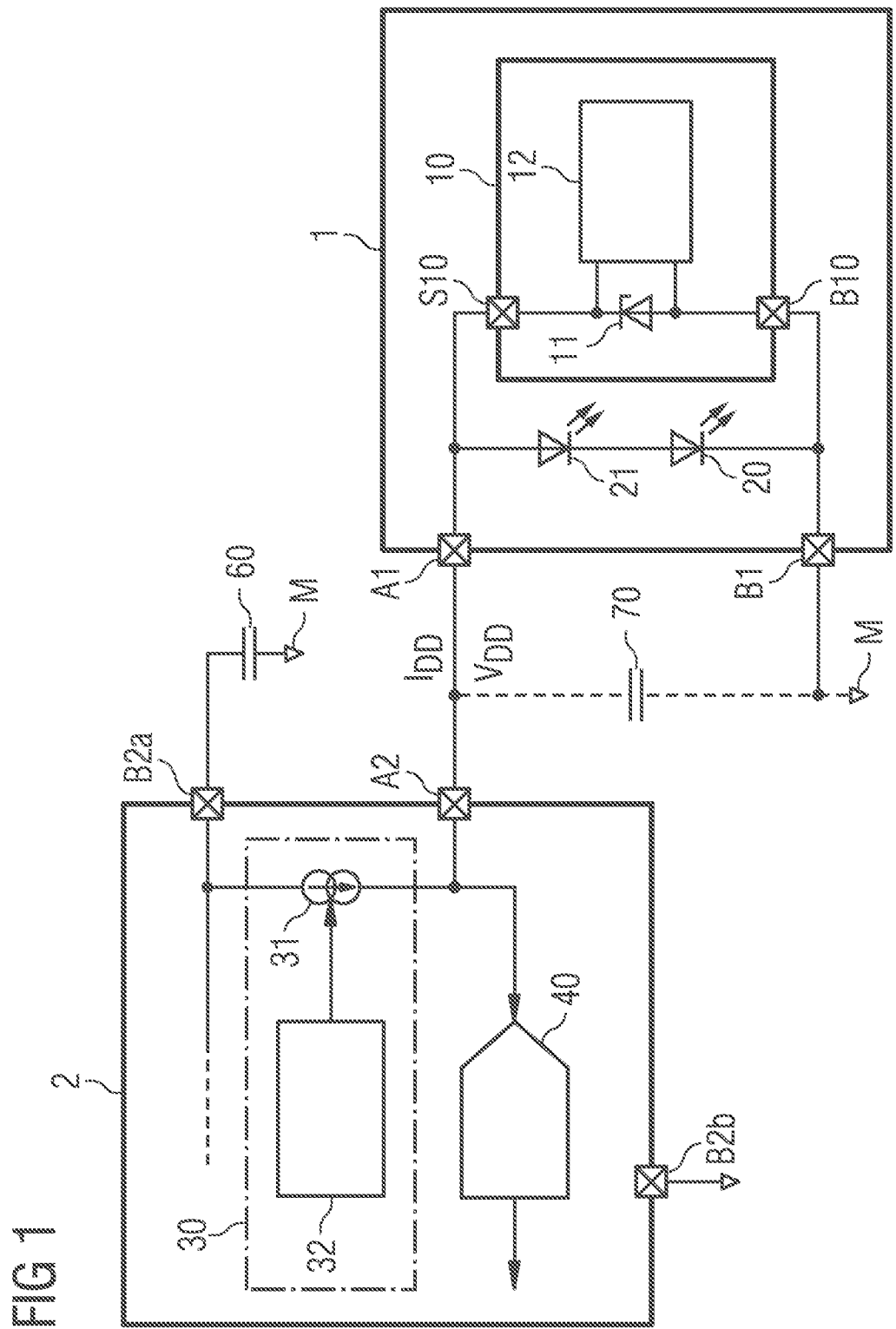

In order to control a light module, in particular an LED module, for generating a light signal, the light module can be coupled to a control module. FIG. 1 shows such a light module 1, which is connected to a control module 2 for controlling the generation of a light signal. The light module can be an LED module or a blinking light module for generating a blinking light. An external connection A1 of the light module 1 is connected to an external connection A2 of the control module 2. A capacitor 70 can be connected to ground on the connecting path between the external connection A1 of the light module 1 and the external connection A2 of the control module 2. The communication between the control module and the light module can be bidirectional, with the result that control signals can be transmitted from the control module 2 to the light module 1 and response signals can be transmitted in the reverse direction from the light module 1 to the control module 2.

The control module 2 can be in the form of an integrated driver circuit, for example, which is arranged separately from the light module 1 in a separate housing. The control module 2 has a reference voltage connection B2a, which is connected to a reference voltage connection M, for example a ground connection, via a capacitor 60. A further reference voltage connection B2b can likewise be connected to a ground potential. The control module also has an external connection A2 for generating a control signal $I_{DD}$. The control signal can be a control current, for example, which is generated by the control module for controlling the light module 1 with different levels and is provided at the external connection A2.

The control module 2 comprises a control signal generation device 30 for generating the control signal $I_{DD}$. The control signal generation device 30 has a controllable current source 31 and a control unit 32 for controlling the controllable current source 31. The control signal generation device 30 generates, for example, different levels of the control signal $I_{DD}$ depending on the modulation of the controllable current source 31 by the control unit 32. The control signal $I_{DD}$ can be a current, for example, which has different current levels depending on the modulation of the current source 31.

In response to the control signal $I_{DD}$ from the control module, the light module 1 generates a response signal $V_{DD}$, which can be supplied to the external connection A2 of the control module. The response signal can be a voltage signal, for example. The control module 2 comprises a reception device 40 for receiving and evaluating the response signal.

The light module 1 comprises a reception device 10 for receiving the control signal $I_{DD}$ and a light generation device 20. The light generation device 20 can comprise, for example, light-emitting diodes 21 for generating a light signal, for example a blinking light.

The reception device 10 has a signal connection S10, with which it is connected to the external connection A1 of the light module. At a reference voltage connection B10, the reception device 10 is connected to an external reference voltage connection B1 of the light module 1, which for its part can be coupled to a reference voltage potential M.

The receiver circuit 10 comprises a memory circuit 12, which can be in the form of an EEPROM and in the form of a digital circuit, for example. Information relating to the luminous intensity of the light generation device 20 can be stored in the memory unit, for example. Furthermore, the reception device 10 comprises a voltage limitation circuit 11, which can be in the form of a controllable Zener diode, for example.

The communication between the control module 2 and the light module 1 takes place by virtue of different levels of the control signal $I_{DD}$ being applied to the external connection A1. The levels of the control signal are received and evaluated by the reception device 10. The voltage limitation circuit 11 can be in the form of a regulated shunt resistor (shunt regulator) which causes a constant voltage to be present at the light generation device 20 in the communication operating mode of the light module with the control module 1, said voltage being below the voltage required for operating the light-emitting diode 21. Therefore, no light signal is generated by the light-emitting diodes 21 in the communication operating mode.

In accordance with a possible embodiment, for the communication between the control module 2 and the light module 1, the control module 2 can generate the control signal with different levels at the external connection A2, which levels are received and evaluated by the reception device 10 of the light module 1. The reception device 10 can, for example, receive current levels of the control signal $I_{DD}$ and evaluate the current levels. Depending on the absolute levels of the control current, the reception device can generate a data and clock signal.

Figure 2:
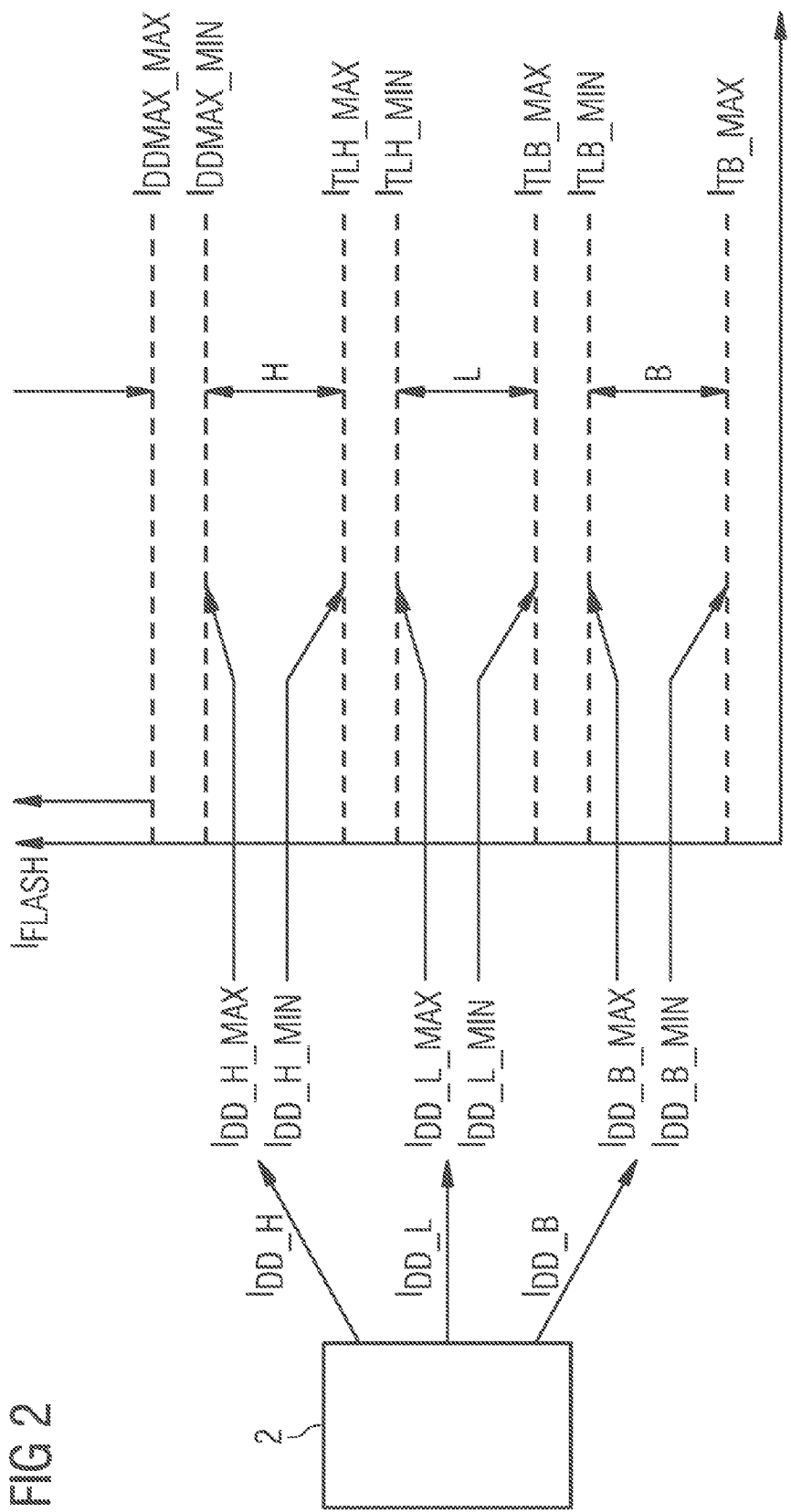

FIG. 2 shows an embodiment in which the control module 2 generates different levels of the control signal $I_{DD}$, for example current levels of a control current. The levels of the control signal $I_{DD}$ are supplied to a reception device of the light module and evaluated thereby by virtue of them being compared with predetermined threshold values, for example. The absolute levels of the control signal $I_{DD}$ are sensitive to manufacturing fluctuations which occur during manufacture of the control module 2, however. Furthermore, leakage currents of the light-emitting diodes 21 and tolerances of components of the reception device 10, for example manufacturing-related tolerances of comparators and the noise occurring during operation of the light module in the circuit, cause the level $I_{DD\_B}$, which is received by the reception device 10 and corresponds to a reference level, the level $I_{DD\_L}$, which corresponds to a low level (level 0), and the level $I_{DD\_H}$, which corresponds to a high level (level 1), to fluctuate within specific tolerance ranges.

FIG. 2 shows three different setpoint levels $I_{DD\_B}$, $I_{DD\_L}$ and $I_{DD\_H}$, which are intended to be generated ideally by the control module. Owing to manufacturing-related tolerances of the circuits of the control module 2, however, the level $I_{DD\_B}$ fluctuates, for example, between a low level $I_{DD\_B\_MIN}$ and a high level $I_{DD\_B}$, the level $I_{DD\_L}$ fluctuates between a low level $I_{DD\_L\_MIN}$ and a relatively high level $I_{DD\_L\_MAX}$, and the current level $I_{DD\_H}$ fluctuates between a relatively low level $I_{DD\_H\_MIN}$ and a relatively high level $I_{DD\_H\_MAX}$.

Owing to leakage currents of the light-emitting diodes 21 and other manufacturing-related tolerances of the circuits on the side of the light module 1, these MIN/MAX levels again fluctuate in the light module. Thus, at the signal connection S10, the reference level $I_{DD\_B}$ of the control signal $I_{DD}$ can fluctuate between the levels $I_{TB\_MAX}$ and $I_{TLB\_MIN}$ and the low level $I_{DD\_L}$ of the control signal can fluctuate between the levels $I_{TLB\_MAX}$ and $I_{TLH\_MIN}$ and the high level $I_{DD\_H}$ of the control signal can fluctuate between the levels $I_{TLH\_MAX}$ and $I_{DDMAX\_MIN}$.

In order to limit the fluctuation range of the reference level B, the low level L and the high level H, the reception device 10 needs to have good absolute voltage and current level accuracy, low offsets of current comparators of the receiver circuit and high switching threshold values. In order to meet these requirements, both the circuit of the control module and the circuit of the light module would have to take up a large chip surface area and would have a high current consumption.

It is desirable to specify a receiver circuit for receiving an input signal, in which levels of the input signal are uniquely identified and which can nevertheless be implemented in a space-saving manner. Furthermore, the intention is to specify a light module for generating a light signal with such a receiver circuit and a circuit arrangement with a light module and a control module which communicate with one another securely and reliably. Furthermore, it is desirable to specify a method for evaluating an input signal for a receiver circuit for generating a data signal, in which method states of the input signal are securely identified and the data signal is therefore generated reliably.

An embodiment of a receiver circuit for receiving an input signal comprises an input connection for applying the input signal and a detector circuit for generating a referential signal, wherein the detector circuit is connected to the input connection. The detector circuit is designed to detect a level of the input signal and to generate the referential signal depending on the detected level. Furthermore, the receiver circuit comprises an offset circuit for generating a comparison signal, wherein the offset circuit is connected to the input connection. The offset circuit is designed to add an offset level to the level of the input signal and to generate the level of the comparison signal depending on the addition. Furthermore, the receiver circuit comprises a comparator circuit for generating a level of a data signal, wherein the comparator circuit is connected to the offset circuit and the detector circuit. The comparator circuit is designed to generate the level of the data signal depending on a comparison of the level of the referential signal with the level of the comparison signal.

An embodiment of a light module for generating a light signal comprises a receiver circuit for receiving an input signal in accordance with the above-cited embodiment and a light generation device for generating the light signal. The light module can be operated in a first operating state, in which the receiver circuit generates the level of the data signal depending on the level of the input signal and the generation of the light signal by the light generation device is interrupted. The module can be operated in a second operating state, in which the light generation device generates the light signal and in which the generation of the data signal is interrupted by evaluation of the input signal by the receiver circuit.

An embodiment of a circuit arrangement for controlling the generation of a light signal comprises a light module for generating a light signal according to the abovementioned embodiment with an external connection for applying the control signal, wherein the light module generates the input signal depending on the control signal. Furthermore, the circuit arrangement comprises a control module for controlling the generation of the light signal with an external connection for generating the control signal for the light module. The external connection of the light module is coupled to the external connection of the control circuit.

A method for evaluating an input signal for a receiver circuit for generating a data signal is specified below. The method comprises the following steps:

applying the input signal to the receiver circuit, detecting a level of the input signal and generating a referential signal depending on the detected level of the input signal, adding an offset level to the level of the input signal and generating a level of a comparison signal depending on the addition, and generating a level of a data signal depending on a comparison of the level of the referential signal to the level of the comparison signal.

Figure 3:
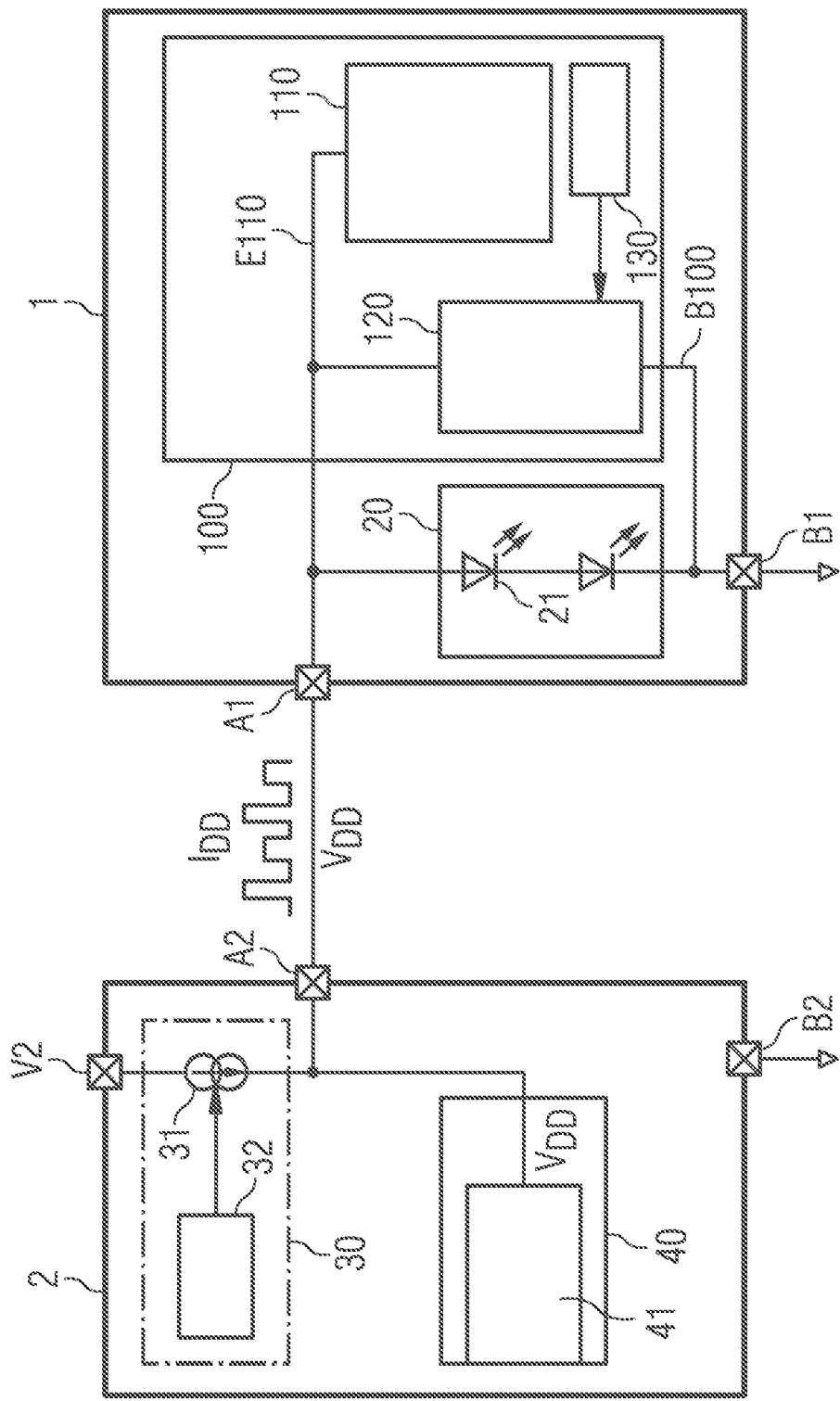
Figure 4:
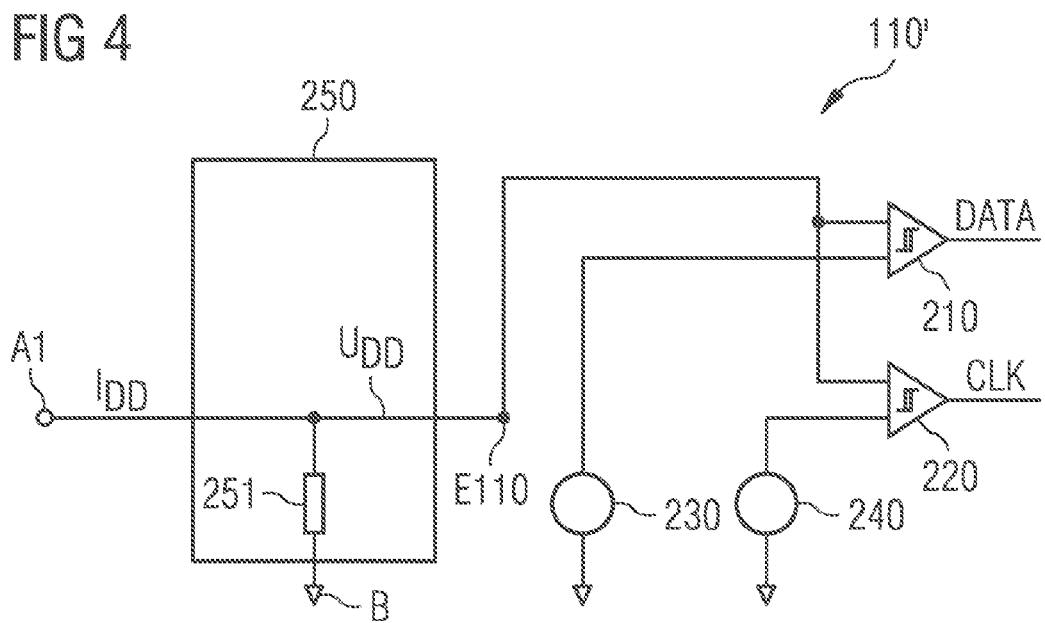
Figure 5:
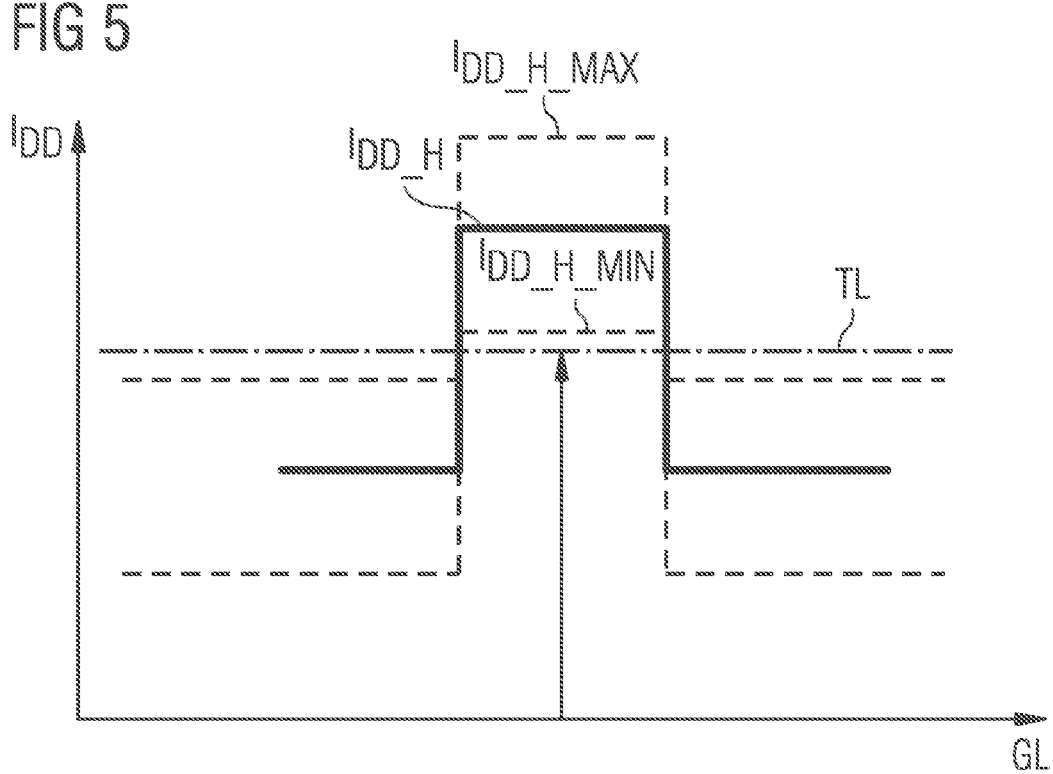
Figure 6A:
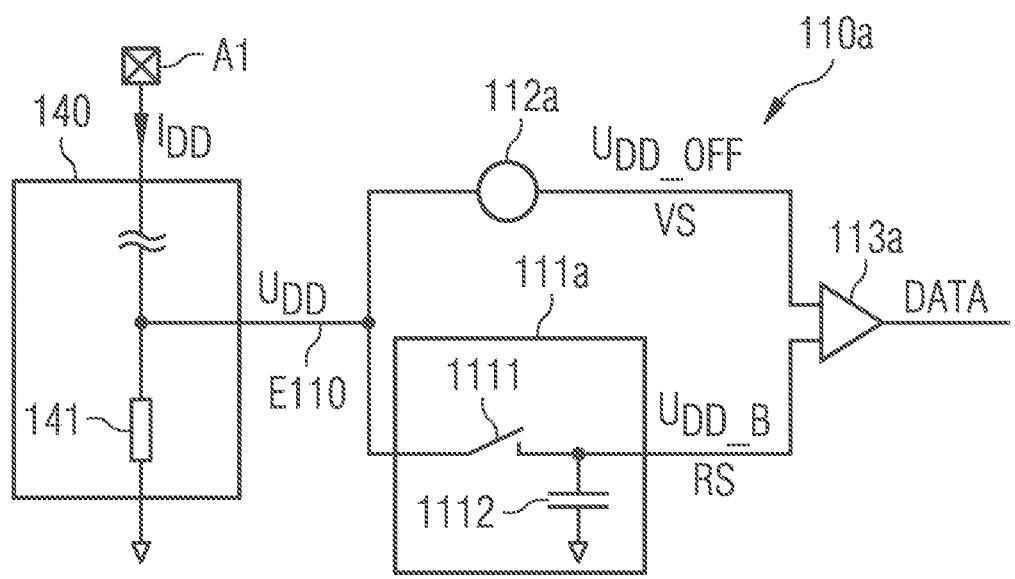
Figure 6B:
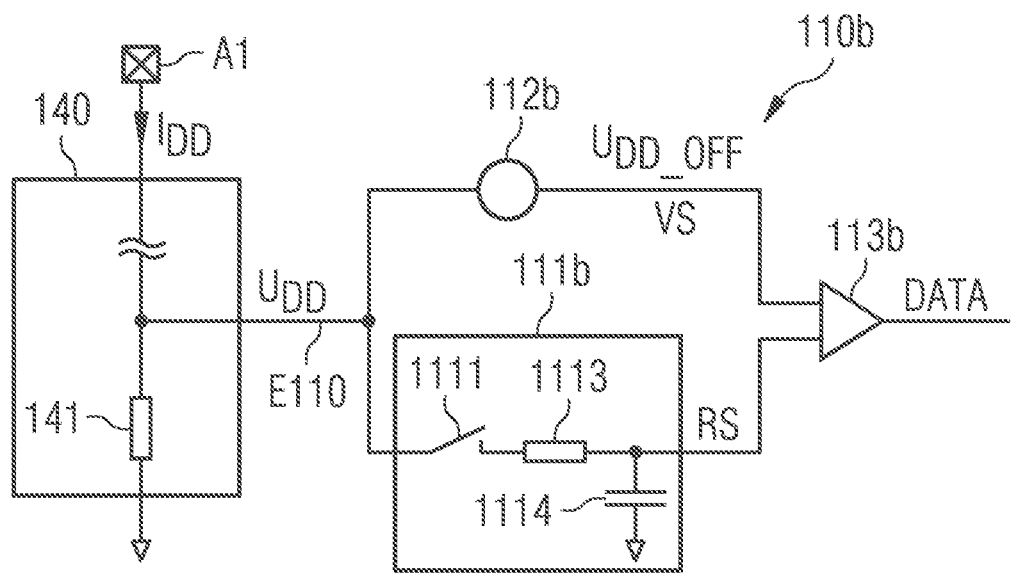
Figure 7A:
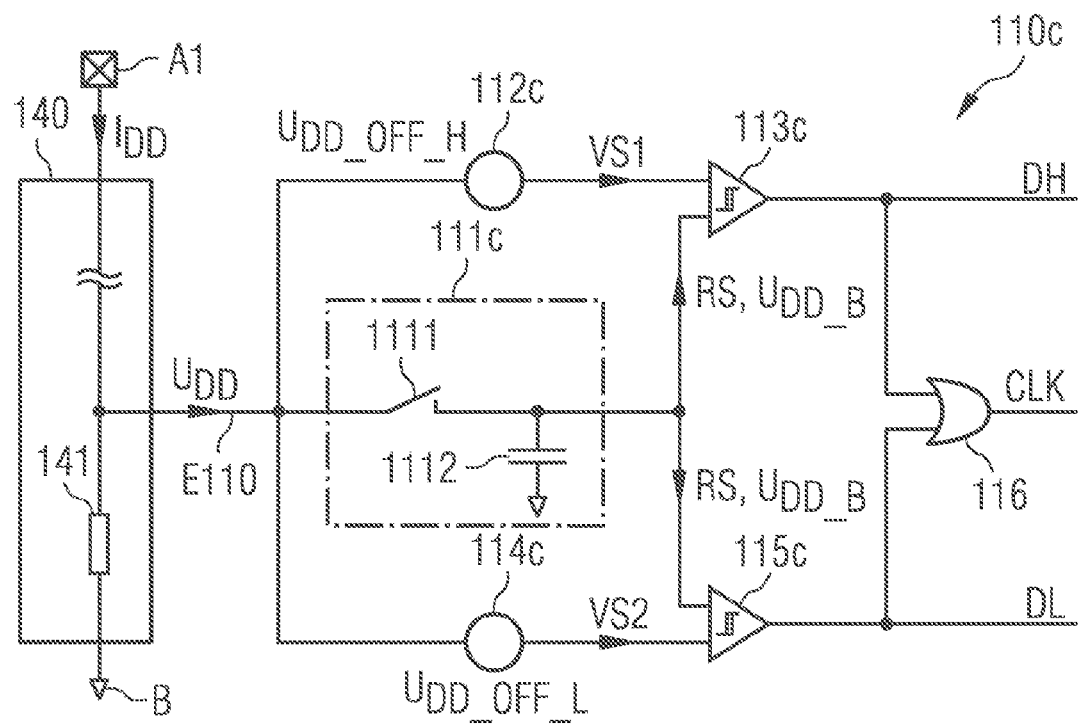
Figure 7B:
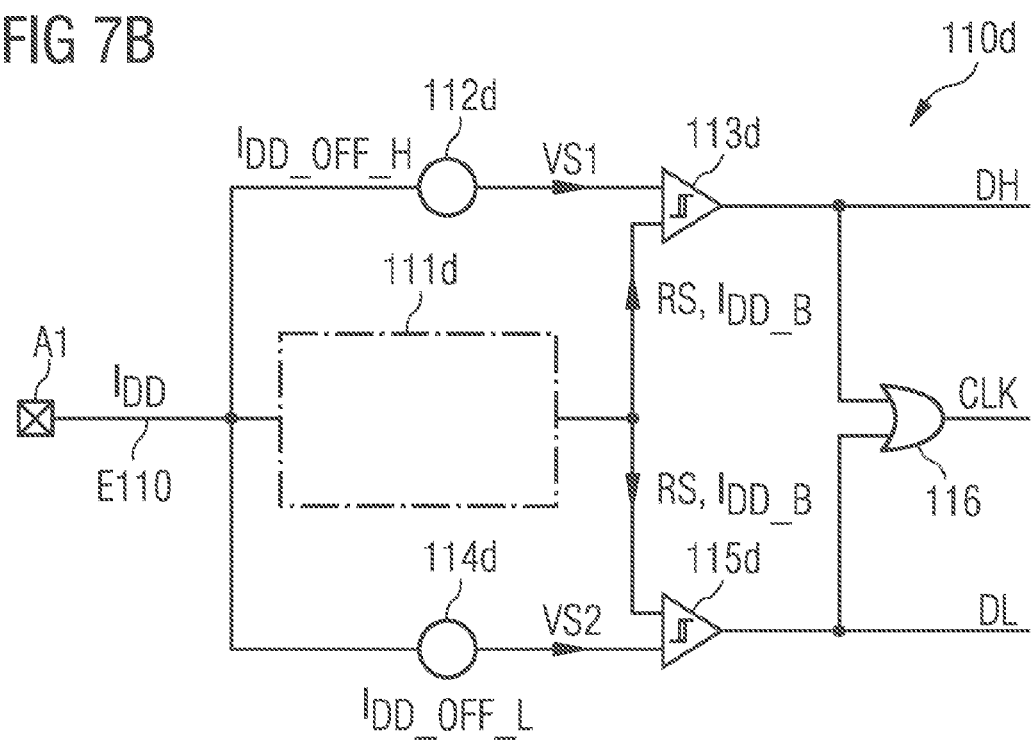
Figure 8A:
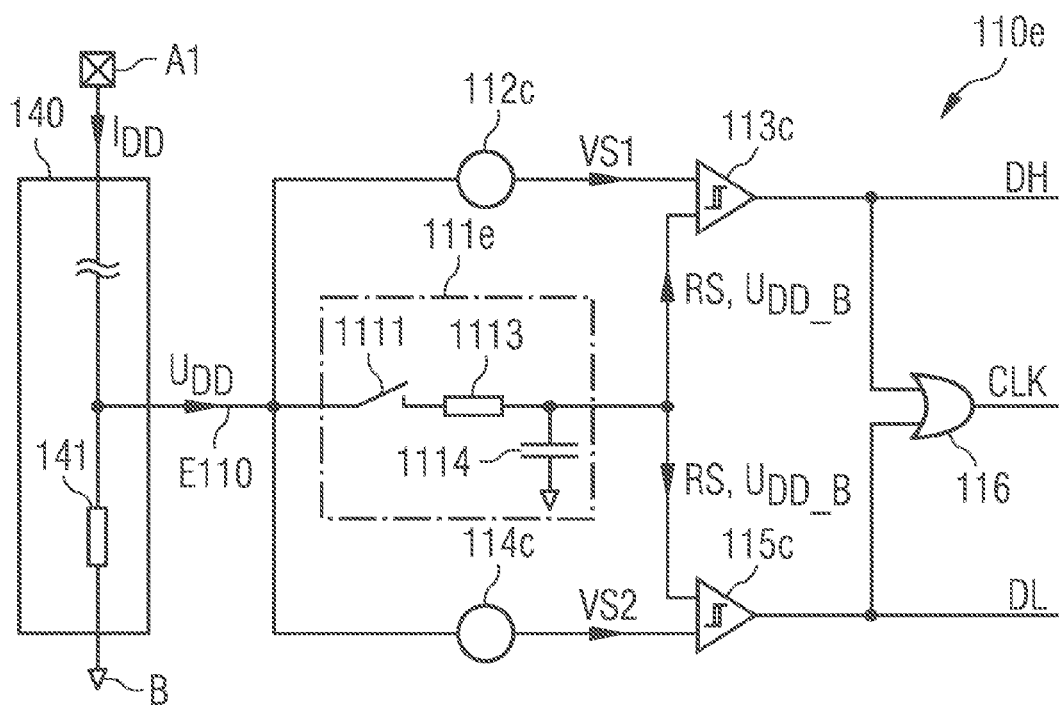
Figure 8B:
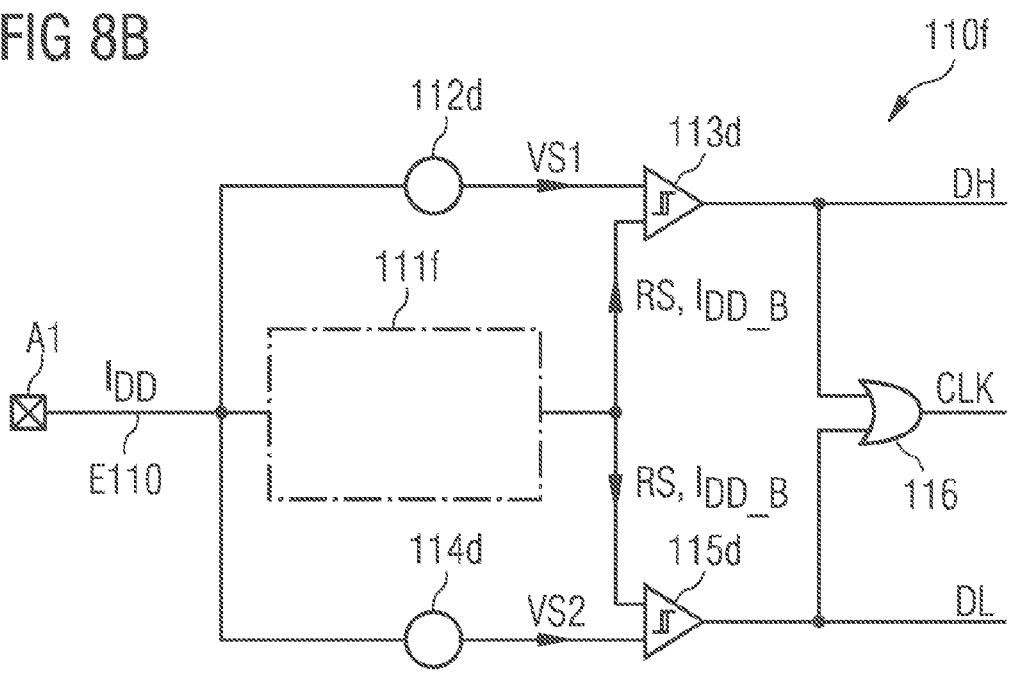
Figure 9:
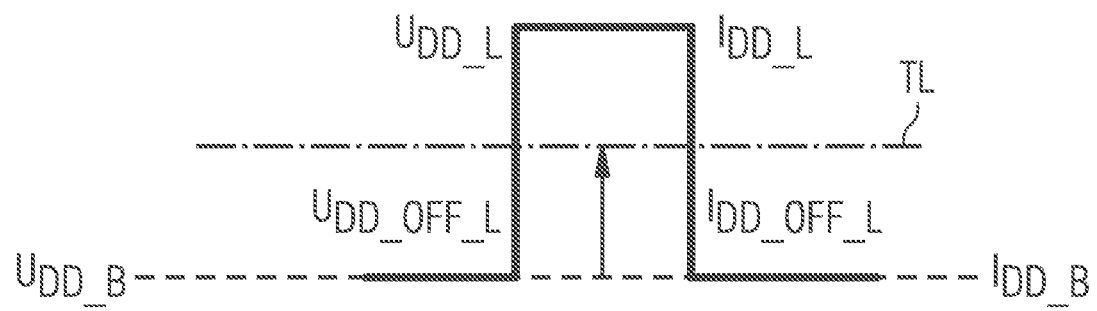

The invention will be explained in more detail below with reference to figures, which show exemplary embodiments of the present invention. In said figures:

FIG. 1 shows an embodiment of a circuit arrangement for communication between a control module and a light module, FIG. 2 shows absolute levels of an input signal at a receiver circuit of a light module for controlling the light module, FIG. 3 shows an embodiment of a circuit arrangement for communication between a control module and a light module, FIG. 4 shows an embodiment of a receiver circuit for absolute evaluation of levels of an input signal, FIG. 5 shows a fluctuation range for levels of a control signal, FIG. 6A shows an embodiment of a receiver circuit for receiving and evaluating an input signal, FIG. 6B shows a further embodiment of a receiver circuit for receiving and evaluating an input signal, FIG. 7A shows a further embodiment of a receiver circuit for receiving and evaluating an input signal, FIG. 7B shows a further embodiment of a receiver circuit for receiving and evaluating an input signal, FIG. 8A shows a further embodiment of a receiver circuit for receiving and evaluating an input signal, FIG. 8B shows a further embodiment of a receiver circuit for receiving and evaluating an input signal, FIG. 9 shows levels of an input signal related to a reference level.

FIG. 3 shows an embodiment of a circuit arrangement with a light module 1, in particular an LED module or a blinking light module, and a control module 2, whose external connections A1 and A2 are coupled to one another, with the result that the two modules can communicate with one another. The control module 2 has a supply voltage connection V2 for applying a supply voltage and a reference voltage connection B2 for applying a reference potential. In order to generate a control signal $I_{DD}$ for communication with the light module 1, the control module 2 comprises a control signal generation device 30 with a controllable current source 31 for generating a control current $I_{DD}$ and a control unit 32 for controlling the controllable current source 31. The control signal generation device is designed to generate the control signal $I_{DD}$ with different levels and to provide said control signal at the external connection A1. The control signal generation device can generate the control signal $I_{DD}$, for example with a reference level $I_{DD\_BB}$, a low level $I_{DD\_L}$ and a high level $I_{DD\_H}$. In order to receive a response signal $V_{DD}$ which is generated by the light module 1, the control module 2 has a reception device 40, which contains a receiver circuit 41.

The light module 1 has an external connection A1, at which the control signal $I_{DD}$ is received, and a reference voltage connection B1 for applying a reference potential. Furthermore, the light module 1 comprises a receiver device 100, which can be in the form of an integrated circuit, and a light generation device 20, which can comprise light-emitting diodes 21. The light generation device 20 and the receiver device 100 are connected between the external output connection A1 and the reference voltage connection B1.

The receiver device 100 comprises a receiver circuit 110, a shunt regulator 120, which generates the response signal $V_{DD}$, and a control signal generation device 130. An input connection E110 of the receiver circuit 110 is connected to the external connection A1 of the light module. The control signal $I_{DD}$ present at the external connection A1 is supplied to the receiver circuit 110 at the input connection E110 as input signal $I_{DD}$. The receiver circuit 110 is designed to evaluate the level states of the input signal $I_{DD}$ and to generate levels of a data and clock signal depending on the evaluation. The shunt regulator 120 serves to limit the voltage present at the light generation device 20. In the operating state of the light module in which communication between the control module 2 and the light module 1 takes place, the shunt regulator controls the voltage level of the voltage present at the light generation device in such a way that the level is below a level which is required for triggering a light signal by the light source 20. The control signal generation device 130, for communication with the control module 2, generates a response signal $V_{DD}$, which is provided at the external connection A1 and is supplied to the control module 2 for evaluation by the receiver circuit 41.

FIG. 4 shows an embodiment 110' of the receiver circuit for absolute evaluation of levels of the input signal $I_{DD}$. The control signal $I_{DD}$ is received at the external connection A1 of the light module. The control signal $I_{DD}$ can be a control current, for example, which is provided by the control module 2 (not illustrated). A current/voltage converter circuit 250 with a current/voltage converter 251, which can be in the form of a resistor, for example, converts the control current signal $I_{DD}$ into a voltage signal. The voltage signal is supplied to an input connection E110' of the receiver circuit 110' as input signal $U_{DD}$.

The receiver circuit 110' has a voltage comparator 210 and a voltage comparator 220, to which the input signal $U_{DD}$ is supplied. The voltage comparator 210 compares the voltage level of the input signal $U_{DD}$ supplied to it with a referential voltage, which is provided by a referential voltage source 230. The voltage comparator 210 generates, on the output side, a data signal DATA with a high level when the absolute level of the input signal $U_{DD}$ is above a predetermined threshold value, which is provided by the referential voltage source 230. When the level of the input signal $U_{DD}$ is below the level of the referential signal, the data signal DATA with a low level is generated.

The comparator circuit 220, which can likewise be in the form of a voltage comparator, is provided for generating a clock signal CLK. The input signal $U_{DD}$ and a referential signal, which is generated by a referential voltage source 240, are supplied to the comparator circuit 220 on the input side. Depending on a comparison of the level of the input signal $U_{DD}$ with a preset threshold value, which is provided by the voltage source 240, the comparator circuit 220 generates rising and falling edges of the clock signal CLK on the output side.

FIG. 5 shows possible absolute fluctuations in a level of the control signal $I_{DD}$ in relation to a reference level GL, for example a ground level. The input signal $U_{DD}$ of the receiver circuit has a fluctuation range of the same order of magnitude. Depending on manufacturing-related tolerances of circuit structures on the part of the control module and the light module as well as on the basis of leakage currents of the light-emitting diodes 21, a setpoint level $I_{DD\_H}$ of the control signal $I_{DD}$, which corresponds to a level 1, fluctuates between a minimum value $I_{DD\_H\_MIN}$ and a maximum level $I_{DDH\_MAX}$.

The comparator circuit 210 compares the level of the input signal supplied to it on the input side with the referential level, which is generated by the referential voltage source 230. In the current domain, the referential voltage level corresponds to a referential current level, which is denoted by TL in FIG. 5. Owing to the level fluctuations of the control signal $I_{DD}$, the minimum level $I_{DD\_H\_MIN}$ of the high level of the control signal $I_{DD}$ is only just above the level TL of the referential signal, with the result that the high state of the data signal DATA is only just identified by the comparator circuit 210. If, however, owing to manufacturing tolerances, leakage currents and noise, the minimum level of the high state of the control signal $I_{DD}$ falls below the preset level TL of the referential signal, the comparator circuit 210 no longer identifies the high state of the control signal $I_{DD}$.

FIGS. 6A, 6B, 7A, 7B, 8A and 8B show embodiments of the receiver circuit 110 for receiving and evaluating an input signal in the form of an input current $I_{DD}$ or an input voltage $U_{DD}$. The input voltage is in this case dependent on the control signal present at the external connection A1. The control signal $I_{DD}$ can be an amplitude-modulated control current, for example.

The receiver circuits 110a, 110c and 110e are designed to evaluate an input voltage $U_{DD}$. Therefore, a current/voltage converter circuit 140 with a current/voltage converter 141 is connected upstream of the input connection E110 of the receiver circuits 110a, 110c and 110e, by means of which current-voltage converter 141 the amplitude-modulated control current $I_{DD}$ present at the external connection A1 is converted into an amplitude-modulated control voltage $U_{DD}$. The current/voltage converter 141 can be a resistor, for example. The receiver circuits 110b, 110d and 110f receive and evaluate directly the amplitude-modulated control current $I_{DD}$. Therefore, the control current present at the external connection A1 is supplied to the input connections E110 of the receiver circuits 110b, 110d and 110f as input signal.

In the embodiments of the receiver circuits shown in FIGS. 6A, 6B, 7A, 7B, 8A and 8B, the levels of the input signal $I_{DD}$, $U_{DD}$ are not evaluated absolutely, but relatively in relation to a reference level. For this purpose, first a reference level $I_{DD\_B}$ $U_{DD\_B}$ of the input signal is determined by means of a detector circuit. The reference level does not correspond to the high or low level of the control signal. The low/high level can, as shown in FIG. 2, in each case be above the reference level $I_{DD\_B}$ or the reference level of the control signal can also be between the low/high level of the control signal.

After determination of the reference level $I_{DD\_B}$, $U_{DD\_B}$, the actual low and high levels of the input signal $I_{DD}$, $U_{DD}$ is not compared with a preset referential level but with the determined reference level of the input signal. The determined reference level of the input signal already contains the deviations from the setpoint reference level of the input signal which result owing to the tolerances of the components/circuits of the modules, the leakage currents and the noise in the modules. The low and high levels of the input signal are subject to the same errors. Owing to the comparison of the low and high levels of the input signal with the reference level of the input signal, the evaluation of the signal levels takes place relatively instead of absolutely in relation to a fixed referential level, as is the case in the receiver circuit shown in FIG. 4. Since the reference level and the low/high level are subject to the same errors, the evaluation of the signal levels of the input signal $I_{DD}$, $U_{DD}$ takes place with error compensation.

After a comparison of the present level of the input signal $I_{DD}$, $U_{DD}$ with the reference level $I_{DD\_B}$, $U_{DD\_B}$, the receiver circuits 110a and 110b generate a data signal DATA with a high or low level. After a comparison of the present level of the input signal $I_{DD}$, $U_{DD}$ with the reference level $I_{DD\_B}$, $U_{DD\_B}$, the receiver circuits 110c, 110d, 110e and 110f generate a data signal DH, a data signal DL and a clock signal CLK. The data signal DH is generated with a level 1 and the data signal DL is generated with a level 0 when the input signal $I_{DD}$, $U_{DD}$ or the control signal $I_{DD}$ has the high level. The data signal DH is generated with a level 0 and the data signal DL is generated with a level 1 when the input signal $I_{DD}$, $U_{DD}$ has the level 0.

In the embodiment 110a of the receiver circuit 110 shown in FIG. 6A, the control current $I_{DD}$, which is present at the external connection A1, is converted into the input signal $U_{DD}$ in the form of an input voltage by a current/voltage converter circuit 140 and in particular the current/voltage converter 141 and supplied to the input connection E110 of the receiver circuit 110a.

The receiver circuit 110a comprises a detector circuit 111a for determining the reference level $U_{DD\_B}$ of the input signal $U_{DD}$. The detector circuit 111a is designed to detect the reference level $U_{DD\_B}$ of the input signal $U_{DD}$ and to generate the referential signal RS depending on the detected level. The detector circuit 111a generates, on the output side, a referential signal RS, for example, which corresponds to a referential voltage with the reference level $U_{DD\_B}$.

The detector circuit 111a is connected to the input connection E110. It is in the form of a sample-and-hold circuit, which, after sampling of the input signal $U_{DD}$, stores the reference voltage level $U_{DD\_B}$ of the input voltage. The sample-and-hold circuit 111a can be in the form of an analog circuit. The detector circuit 111a can have a controllable switch 1111 and a capacitor 1112, wherein the controllable switch can be switched into a first and a second state. In the first state, the capacitor is connected to the input connection E110 at a higher resistance than in the second state of the controllable switch. The controllable switch can be controlled so as to be off or on, for example. In the first, high-resistance or off state of the controllable switch, the capacitor can be isolated from the input connection, while in the second, low-resistance or on state, it is connected to the input connection.

Furthermore, the receiver circuit 110a comprises an offset circuit 112a for generating a comparison signal VS, which is connected to the input connection E110. The offset circuit 112a adds an offset level $U_{DD\_OFF}$ to the level of the control signal $U_{DD}$ and generates a level of the comparison signal VS depending on the addition. The offset level $U_{DD\_OFF}$ can correspond to half the high level or low level of the control signal $U_{DD}$.

Furthermore, the receiver circuit 110a comprises a comparator circuit 113a for generating a low or high level of the data signal DATA. The comparator circuit 113a is connected to the offset circuit 112a and the detector circuit 111a, with the result that the comparison signal VS and the referential signal RS are supplied to said comparator circuit on the input side. The comparator circuit 113a is designed to generate the level of the data signal DATA depending on a comparison of the level of the referential signal RS with the level of the comparison signal VS. The comparator circuit 113a can be in the form of a voltage comparator.

In order to generate the data signal DATA, the control current $I_{DD}$ is applied at the external connection A1, said control current being converted into the input voltage $U_{DD}$ by the current/voltage converter circuit 140. The control voltage $U_{DD}$ is present at the input connection E110 of the receiver circuit 110. In order to determine the reference voltage level $U_{DD\_B}$ of the control voltage $U_{DD}$, the controllable switch 1111 is switched into the closed, on state after an initialization phase for a defined time, for example a time of between 50 µs and 200 µs. During the initialization phase, the control signal $I_{DD}$ with the reference level $I_{DD\_B}$ is present at the external connection A1. Once the initialization phase has elapsed, the controllable switch 1111 is controlled so as to be off again. A charge is now stored on the capacitor 1112, said charge corresponding to the reference level $U_{DD\_B}$ of the input signal. The comparators 113a compare the voltage level $U_{DD\_B}$ of the referential signal RS with the comparison signals VS when the control signal $I_{DD}$ is applied to the external connection A1. Depending on the comparison, the level of the data signal DATA is generated. The levels of the input signal $U_{DD}$ are therefore evaluated relative to the reference voltage level $U_{DD\_B}$.

FIG. 6B shows a further embodiment 110b of the receiver circuit 110. As in the embodiment shown in FIG. 6A, the receiver circuit 110b evaluates the voltage level of the input signal. For this purpose, the control signal $I_{DD}$ is converted into an input voltage signal $U_{DD}$ by the current/voltage converter circuit 140. The offset circuit 112b and the comparator circuit 113b correspond to the offset circuit and the comparator circuit of the receiver circuit 110a.

In contrast to the embodiment of the receiver circuit shown in FIG. 6A, the detector circuit 111b is in the form of a filter circuit for determining a mean value of the level of the input signal $U_{DD}$ present at the input connection E110 during a time period. The determined mean value of the input signal is supplied to the comparator circuit 113b as referential signal RS. The detector circuit 111b comprises a resistor 1113 and a capacitor 1114. Optionally, as in the embodiment shown in FIG. 6A, a controllable switch 1111 can be provided.

In order to determine the mean value of the input signal $U_{DD}$, alternating levels of the input signal $U_{DD}$ can be present at the input connection E110 during an initialization phase. The low level and the high level of the input signal $U_{DD}$ can fluctuate by a reference voltage level $U_{DD\_B}$ of the input signal, for example. The low level can be below the reference voltage level and the high level can be above the reference voltage level, for example. If the detector circuit has the controllable switch 1111, the controllable switch 1111 is switched to the on or low-resistance state during the initialization phase. After the initialization phase, which can last between 50 µs and 200 µs, for example, the mean value $U_{DD\_B}$ of the input signal present at the input connection E110 during this time is stored in the detector circuit 111b. In a subsequent step, input signal levels of the control current $I_{DD}$ are applied to the input connection E110 for evaluation. The controllable switch is then controlled so as to be off.

In order to evaluate the input signal levels applied to the input connection E110, the referential signal RS with the reference voltage level $U_{DD\_B}$ is supplied to the voltage comparator 113b by the detector circuit 111b. The voltage comparator 113b compares the comparison signal VS with the reference voltage level $U_{DD\_B}$ of the referential signal RS and generates the data signal DATA with a high or low level. Therefore, the levels of the input signal $U_{DD}$ are evaluated relative to the reference voltage level $U_{DD\_B}$.

In the embodiment 110c of the receiver circuit 110 shown in FIG. 7A, the control current $U_{DD}$ which is present at the external connection A1 is converted into the input signal $U_{DD}$ in the form of an input voltage by the current/voltage converter circuit 140 and in particular the current/voltage converter 141 and supplied to the input connection E110 of the receiver circuit 110c.

The receiver circuit 110c comprises a detector circuit 111c for determining the reference level $U_{DD\_B}$ of the input signal $U_{DD}$. The detector circuit 111c is designed to detect the reference level $U_{DD\_B}$ of the input signal $U_{DD}$ and to generate the referential signal RS depending on the detected level. The detector circuit 111c generates, on the output side, for example a referential signal RS, which corresponds to a referential voltage with the reference level $U_{DD\_B}$.

The detector circuit 111c is connected to the input connection E110. It is in the form of a sample-and-hold circuit, which, after sampling of the input voltage $U_{DD}$, stores the reference voltage level $U_{DD\_B}$ of the input voltage. The sample-and-hold circuit 111c can be in the form of an analog circuit. The detector circuit 111c has a controllable switch 1111 and a capacitor 1112. The detector circuit is designed in such a way that the controllable switch 1111 can be switched into a first and a second state. In the first state, the capacitor 1112 is connected to the input connection E110 at a higher resistance than in the second state of the controllable switch. The controllable switch can be switched into an off and an on state, for example. In the first, high-resistance or off state of the controllable switch, the capacitor 1112 can be isolated from the input connection, while it is connected to the input connection in the second, low-resistance or on state.

Furthermore, the receiver circuit 110c comprises an offset circuit 112c for generating a comparison signal VS1, which is connected to the input connection E110. The offset circuit 112c adds an offset level $U_{DD\_OFF\_H}$ to the level of the control signal $U_{DD}$ and generates a level of a comparison signal VS1 depending on the addition. The offset level $U_{DD\_OFF\_H}$ can correspond to half the high level. Furthermore, the receiver circuit 110c comprises an offset circuit 114c for generating a comparison signal VS2, which is likewise connected to the input connection E110. The offset circuit 114c adds an offset level $U_{DD\_OFF\_L}$ to the level of the control signal $U_{DD}$ and generates a level of the comparison signal VS2 depending on the addition. The offset level $U_{DD\_OFF\_L}$ can correspond to half the low level.

Furthermore, the receiver circuit 110c comprises a comparator circuit 113c for generating a level of the data signal DH. The comparator circuit 113c is connected to the offset circuit 112c and the detector circuit 111c, with the result that the comparison signal VS1 and the referential signal RS are supplied to said comparator circuit on the input side. The comparator circuit 113c is designed to generate the level of the data signal DH depending on a comparison of the level of the referential signal RS with the level of the comparison signal VS1. Furthermore, the receiver circuit 110c comprises a comparator circuit 115c for generating a level of a data signal DL. The comparator circuit 115c is connected to the offset circuit 114c and the detector circuit 111c, with the result that the comparison signal VS2 and the referential signal RS are supplied to the comparator circuit 115c on the input side. The comparator circuit 115c is designed to generate the level of the data signal DL depending on a comparison of the level of the referential signal RS with the level of the comparison signal VS2.

The comparator circuits 113c and 115c can be in the form of voltage comparators. The comparator circuit 113c compares a voltage level of the referential signal RS with a voltage level of the comparison signal VS1 and generates the level of the data signal DH depending on the comparison. The comparator circuit 115c compares the voltage level of the referential signal RS with a voltage level of the comparison signal VS2 and generates the level of the data signal DL depending on the comparison. The data signals DH and DL are supplied to a logic circuit 116, which generates a clock signal CLK on the output side after a logic combination of the data signals DH and DL.

In order to generate the data signals DH and DL and the clock signal CLK, the control current $I_{DD}$ is applied to the external connection A1, said control current being converted into the input voltage $U_{DD}$ by the current/voltage converter circuit 120. The control voltage $U_{DD}$ is present at the input connection E110 of the receiver circuit 110. In order to determine the reference voltage level $U_{DD\_B}$ of the control voltage $U_{DD}$, the controllable switch 1111 is switched into the closed, on state, after an initialization phase, for a defined time, for example a time of between 50 μs and 200 μs. During the initialization phase, the control signal $I_{DD}$ with the reference level $I_{DD\_B}$ is present at the external connection A1. Once the initialization phase has elapsed, the controllable switch 1111 is controlled so as to be off again. A charge which corresponds to the reference level $U_{DD\_B}$ of the input signal is now stored on the capacitor 1112. The comparators 113c and 115c compare the voltage level $U_{DD\_B}$ of the referential signal RS with the comparison signals VS1 and VS2 when the control signal $I_{DD}$ is applied to the external connection A1. Depending on the comparison, the data signals DH and DL are generated and from this the clock signal CLK is generated.

FIG. 7B shows a further embodiment 110d of the receiver circuit 110. In contrast to the embodiment shown in FIG. 6A, the receiver circuit 110d evaluates directly the current level of the control signal $I_{DD}$ present at the external connection A1. Thus, it is no longer necessary for a current level to be converted into a voltage level. The input signal at the input connection E110 therefore corresponds to the control signal $I_{DD}$.

The receiver circuit 110d comprises a detector circuit 111d, which is connected to the input connection E110. The control current $I_{DD}$ can be supplied as control signal to the detector circuit 111d. The detector circuit 111d is in the form of a sample-and-hold circuit, which, after sampling of the control current $I_{DD}$, stores a current level of the control current.

The stored current level of the control current can be supplied to a comparator circuit 113d and a comparator circuit 115d as referential signal RS. The comparator circuits 113d and 115d are each in the form of current comparators. The comparator circuit 113d is connected to an offset circuit 112d. The offset circuit 112d is connected to the input connection E110. The comparator circuit 115d is connected to an offset circuit 114d. The offset circuit 114d is connected to the input connection E110.

The offset circuit 112d adds an offset level $I_{DD\_OFF\_H}$, which can correspond to half the high level of the input signal $I_{DD}$, to the input signal $I_{DD}$ and generates, on the output side, the comparison signal VS1 with the level previously calculated from the addition. The comparison signal VS1 is supplied to the current comparator 113d. Therefore, the current comparator 113d compares a current level of the referential signal RS with a current level of the comparison signal VS1 and generates the data signal DH on the output side. The offset circuit 114d adds an offset level $I_{DD\_OFF\_L}$, which can correspond to half the low level of the input signal $I_{DD}$, to the input signal $I_{DD}$ and generates the comparison signal VS2 on the output side. The comparison signal VS2 is supplied to the current comparator 115d. The current comparator 115d compares a current level of the referential signal RS with a current level of the comparison signal VS2 and generates the data signal DL depending on the comparison. The data signals DH and DL are supplied to a logic circuit 116, for example an OR circuit, for generating the clock signal CLK.

As in the embodiment shown in FIG. 7A, in an initialization phase the control signal $I_{DD}$ with the reference level $I_{DD\_B}$ is applied to the external connection A1 in the embodiment of the receiver circuit 110d shown in FIG. 7B as well. The reference level $I_{DD\_B}$ is detected by means of the detector circuit 111d and stored. Then, the sample-and-hold circuit 111d is isolated from the input connection E110 and the current comparators 113d and 115d compare the levels of the comparison signals VS1 and VS2 with the reference level $I_{DD\_H}$ of the referential signal RS once the high and low levels of the control signal $I_{DD}$ have been applied to the external connection A1. Thus, in the receiver circuit illustrated in FIG. 6B as well, there is a relative evaluation of the applied low and high levels of the control signal $I_{DD}$ in relation to the reference level $I_{DD\_B}$.

FIG. 8A shows a further embodiment 110e of the receiver circuit 110. As in the embodiment shown in FIG. 7A, the receiver circuit 110e evaluates voltage levels of the input signal. For this purpose, the control signal $I_{DD}$ is converted into an input voltage signal $U_{DD}$ by the current/voltage converter circuit 140. The offset circuits 112c, 114c and the comparator circuits 113c, 115c correspond to the offset circuits and comparator circuits of the receiver circuit 110c.

In contrast to the embodiment of the receiver circuit shown in FIG. 7A, the detector circuit 111e is in the form of a filter circuit for determining a mean value of the level of the input signal $U_{DD}$ present at the input connection E110 during a time period. The determined mean value of the input signal is supplied to the comparator circuits 113c and 115c as referential signal RS. The detector circuit 111e is constructed in the same way as in the embodiment shown in FIG. 6B and comprises a resistor 1113, a capacitor 1114 and optionally the controllable switch 1111.

In order to determine the mean value of the input signal $U_{DD}$, during an initialization phase alternating levels of the input signal $U_{DD}$ can be applied to the input connection E110. The low and the high level of the input signal $U_{DD}$ can fluctuate, for example, by a reference voltage level $U_{DD\_B}$ of the input signal. The low level can, for example, be below the reference voltage level and the high level can be above the reference voltage level. If the detector circuit 111e has the controllable switch 1111, said controllable switch is controlled so as to be on during the initialization phase. After the initialization phase, which can last between 50 µs and 200 µs, for example, the mean value $U_{DD\_B}$ of the input signal present at the input connection E110 during this time is stored in the detector circuit. In order to evaluate the input signal levels of the control current $I_{DD}$, the controllable switch is controlled so as to be off again.

In order to evaluate the input signal levels applied to the input connection E110, the referential signal RS with the reference voltage level $U_{DD\_B}$ is supplied to the voltage comparators 113c and 115c by the detector circuit 111e. The voltage comparators 113c and 115c then compare the comparison signals VS1 and VS2 with the reference voltage level $U_{DD\_B}$ of the referential signal RS and generate the data signal DH and the data signal DL. Thus, the levels of the input signal $U_{DD}$ are evaluated relative to the reference voltage level $U_{DD\_B}$.

The embodiment of the receiver circuit 110f shown in FIG. 8B corresponds to the embodiment of the receiver circuit 110b shown in FIG. 7B apart from the detector circuit 111f. Thus, in the case of the receiver circuit 110f as well, the current levels of the control signal $I_{DD}$ are applied as input signal directly to the input connection E110 of the receiver circuit 110f. The current comparators 113d and 115d compare the comparison signals VS1 and VS2 generated by the offset circuits 112d and 114d with a referential signal RS, which is generated by the detector circuit 111f.

The detector circuit 111f is in the form of a filter circuit. The detector circuit 111f determines a mean value of the level of the input current $I_{DD}$ present at the input connection E110 during a time period. When the low and high level of the control current $I_{DD}$ fluctuates about a reference current level $I_{DD\_B}$, the detector circuit 111f determines the reference current level $I_{DD\_B}$, which corresponds to the mean value of the input current between the low and high levels. For this purpose, the detector circuit 111f is connected to the input connection E110 during an initialization phase. During this time, the reference current level $I_{DD\_B}$ is stored in the detector circuit 111f. After the initialization phase, the reference current level $I_{DD\_B}$ continues to be stored in the detector circuit and the referential current level of the referential signal RS is supplied to the current comparators 113d and 115d. The current comparators 113d and 115d therefore compare the comparison signals VS1 and VS2 in each case with the reference current level $I_{DD\_B}$ of the control current $I_{DD}$.

FIG. 9 shows the evaluation of a current or voltage level $I_{DD\_L}$, $U_{DD\_L}$ received at the input connection E110 in relation to the reference current level $I_{DD\_B}$ and the reference voltage level $U_{DD\_B}$, respectively. The offset current level $I_{DD\_OFF\_L}$ and the offset voltage level $U_{DD\_OFF\_L}$ correspond to half the current and voltage peaks, respectively, for the low level. The evaluation of the input signal present at the input connection E110 therefore no longer takes place in absolute fashion in relation to a preset reference level, for example a ground level, but in relative fashion in relation to the determined reference current or reference voltage level $I_{DD\_B}$, $U_{DD\_B}$.

The receiver circuit 41 of the control module 2 can likewise be designed in accordance with one of the embodiments 110a, 110c and 110e. The response signal $V_{DD}$ is received at the external connection A2 of the control module. The response signal is supplied to the receiver circuit 41 as input signal $V_{DD}$. When the response signal $V_{DD}$ is a voltage signal, the current/voltage converter circuit 140 can be dispensed with. When the receiver circuit 41 is designed for the relative evaluation of voltage levels, the response voltage signal $V_{DD}$ can be supplied to the receiver circuit 41 directly as input signal. Therefore, the evaluation of a response signal $V_{DD}$ by the control module can therefore also take place by relative evaluation of signal levels instead of absolute evaluation of signal levels. Such an implementation of the control module makes it possible for the light module to permit relatively large changes in the shunt regulator voltage of the shunt regulator 120.

In the light generation device 20, a large number of light-emitting diodes are connected in series with one another and can be operated in a daisy chain configuration. Each of the light-emitting diodes in the series circuit can be addressed separately by read and write command functions. The light-emitting diodes can also be arranged in parallel.

LIST OF REFERENCE SYMBOLS

1 Light module
2 Control module
10 Reception device
20 Light generation device
30 Control signal generation device
40 Reception device
41 Receiver circuit
100 Reception device
110 Receiver circuit
120 Shunt regulator/current/voltage converter
130 Control signal generation device
111 Detector circuit
112 Offset circuit
113 Comparator circuit
114 Offset circuit 115 Comparator circuit
116 Logic circuit
$I_{DD}$ Control signal, input signal
$U_{DD}$ Input signal
VS Comparison signal
RS Referential signal
DH, DL Data signal
CLK Clock signal

The invention claimed is:

1. A receiver circuit for receiving an input signal, comprising:
   an input connection for applying the input signal;
   a detector circuit for generating a referential signal,
      wherein the detector circuit is designed to detect a level of the input signal and to generate a reference level of the referential signal depending on the detected level of the input signal,
      wherein the detector circuit comprises a controllable switch being controlled to be switched to an on-state during an initialization phase to connect the input connection to the detector circuit and to store the reference level of the referential signal in the detector circuit and to be switched in an off-state after the initialization phase, and
      wherein the reference level of the referential signal continues to be stored in the detector circuit after the initialization phase;
   an offset circuit for generating a comparison signal,
      wherein the offset circuit is connected to the input connection, and
      wherein the offset circuit is designed to add an offset level to the level of the input signal and to generate a level of the comparison signal depending on the addition; and
   a comparator circuit for generating a level of a data signal,
      wherein the comparator circuit is connected to the offset circuit and the detector circuit, and
      wherein the comparator circuit is designed to generate the level of the data signal depending on a comparison of the reference level of the referential signal with the level of the comparison signal.

2. The receiver circuit according to claim 1, wherein an input voltage can be supplied as input signal to the detector circuit,
   wherein the detector circuit is in the form of a sample-and-hold circuit, which, after sampling of the input signal, stores a voltage level of the input voltage, and
   wherein the stored voltage level of the input voltage can be supplied to the comparator circuit as the reference level of the referential signal.

3. The receiver circuit according to claim 2, wherein the comparator circuit is in the form of a voltage comparator, which compares a voltage level of the referential signal with a voltage level of the comparison signal and generates the level of the data signal depending on the comparison of the voltage levels of the referential signal and the comparison signal.

4. The receiver circuit according to claim 1, wherein an input current can be supplied as input signal to the detector circuit,
   wherein the detector circuit is in the form of a sample-and-hold circuit, which, after sampling of the input current, stores a current level of the input current, and
   wherein the stored current level of the input current can be supplied to the comparator circuit as the reference level of the referential signal.

5. The receiver circuit according to claim 1, wherein the comparator circuit is in the form of a current comparator, which compares a current level of the referential signal with a current level of the comparison signal and generates the level of the data signal depending on the comparison of the current levels of the referential signal and the comparison signal.

6. The receiver circuit according to claim 1, wherein the detector circuit has a capacitor,
   wherein the detector circuit is designed such that the controllable switch can be switched into a first and a second state, and
   wherein the capacitor is connected to the input connection at a higher resistance in the first state of the controllable switch than in the second state of the controllable switch.

7. The receiver circuit according to claim 6, wherein the detector circuit is designed such that the controllable switch can be switched into the second state for a defined time period, in particular for a time period of between 50 µs and 200 µs.

8. The receiver circuit according to claim 1, wherein the detector circuit is in the form of a filter circuit for determining a mean value of the level of the input signal which is present at the input connection during a time period, and
   wherein the determined mean value of the input signal can be supplied to the comparator circuit as the reference level of the referential signal.

9. The receiver circuit according to claim 8, wherein the detector circuit is designed to determine the mean value of the voltage level of the input voltage or the mean value of the current level of the input current.

10. The receiver circuit according to claim 1, comprising:
    a further offset circuit for generating a further comparison signal,
       wherein the further offset circuit is connected to the input connection, and
       wherein the further offset circuit is designed to add a further offset level to the level of the input signal and to generate a level of the further comparison signal depending on the addition; and
    a further comparator circuit for generating a level of a further data signal, wherein the further comparator circuit is connected to the further offset circuit and the detector circuit,
       wherein the further comparator circuit is designed to generate the level of the further data signal depending on a comparison of the level of the referential signal with the level of the first further comparison signal.

11. A light module for generating a light signal, comprising:
    a receiver circuit for receiving an input signal according to claim 1; and
    a light generation device for generating the light signal,
       wherein the light module can be operated in an operating state, in which the receiver circuit generates the level of the data signal depending on the level of the input signal and the generation of the light signal by the light generation device is interrupted.

12. A circuit arrangement for controlling the generation of a light signal, comprising:
    a light module for generating a light signal according to claim 11 with an external connection for applying a control signal, wherein the receiver circuit receives the input signal being dependent on the control signal; and
    a control module for controlling the generation of the light signal with an external connection for generating the control signal for the light module,
       wherein the external connection of the light module is coupled to the external connection of the control circuit.

13. The circuit arrangement according to claim 12, wherein the light module comprises a control signal generation circuit for generating a response signal for the control module,
  wherein the response signal can be output at the external connection of the light module and can be supplied to the external connection of the control module,
  wherein the control module comprises a receiver circuit for receiving a further input signal, and
  wherein the control module is designed to generate the further input signal depending on the response signal.

14. A method for evaluating an input signal for a receiver circuit for generating a data signal, comprising:
  applying the input signal to the receiver circuit via an input connection;
  detecting a level of the input signal and generating a reference level of a referential signal depending on the detected level of the input signal via a detector circuit,
  wherein the detector circuit comprises a controllable switch being controlled to be switched to an on-state during an initialization phase to connect the input connection to the detector circuit and to store the reference level of the referential signal in the detector circuit and to be switched in an off-state after the initialization phase, and
  wherein the reference level of the referential signal continues to be stored in the detector circuit after the initialization phase;
  adding an offset level to the level of the input signal and generating a level of a comparison signal depending on the addition; and
  generating a level of a data signal depending on a comparison of the reference level of the referential signal to the level of the comparison signal.

15. The method according to claim 14, comprising:
  generating the reference level of the referential signal by:
  a) sampling a current level of the input signal and storing the current level as level of the referential signal, or
  b) sampling a voltage level of the input signal and storing the voltage level as level of the referential signal, and
  c) determining a mean value of the input signal, present at the receiver circuit during a time period by virtue of the mean value of the current level of the input signal or the mean value of the voltage level of the input signal being determined.

* * * * *